(12) United States Patent
Grainger et al.

(10) Patent No.: US 8,504,061 B2
(45) Date of Patent: Aug. 6, 2013

(54) MULTI-TIER GEOFENCE DETECTION

(75) Inventors: Morgan Grainger, Sunnyvale, CA (US); Ronald K. Huang, Milpitas, CA (US); Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 12/756,016

(22) Filed: Apr. 7, 2010

(65) Prior Publication Data

US 2011/0250901 A1  Oct. 13, 2011

(51) Int. Cl.
*H04W 72/00* (2009.01)

(52) U.S. Cl.
USPC .............. 455/456.1; 455/411; 455/412.2; 455/171.1; 455/525; 455/181.1; 455/231; 368/14; 368/21; 368/10; 368/47; 370/328; 370/338

(58) Field of Classification Search
USPC .............. 455/411, 412.2, 456.1, 466.6, 5.2, 455/5.3, 525, 171.1, 181.1, 231; 368/14, 368/21, 10, 47; 370/328, 338
See application file for complete search history.

(56) References Cited

U.S. PATENT DOCUMENTS

| | | | |
|---|---|---|---|
| 5,642,303 A * | 6/1997 | Small et al. | 708/109 |
| 6,445,937 B1 * | 9/2002 | daSilva | 455/574 |
| 7,072,666 B1 * | 7/2006 | Kullman et al. | 455/456.1 |
| 7,633,389 B2 | 12/2009 | Mantovani et al. | |
| 7,848,765 B2 | 12/2010 | Phillips et al. | |
| 2003/0148771 A1 * | 8/2003 | de Verteuil | 455/456 |
| 2006/0068812 A1 * | 3/2006 | Carro et al. | 455/456.3 |
| 2006/0079201 A1 * | 4/2006 | Chung et al. | 455/410 |
| 2008/0280624 A1 | 11/2008 | Wrappe | |
| 2009/0058720 A1 | 3/2009 | Shaw et al. | |
| 2009/0121927 A1 | 5/2009 | Moshfeghi | |
| 2009/0170528 A1 | 7/2009 | Bull et al. | |
| 2009/0312032 A1 | 12/2009 | Bornstein et al. | |
| 2010/0016022 A1 | 1/2010 | Liu et al. | |
| 2010/0109864 A1 | 5/2010 | Haartsen et al. | |
| 2010/0255856 A1 | 10/2010 | Kansal et al. | |
| 2010/0272004 A1 | 10/2010 | Maeda et al. | |
| 2012/0115512 A1 | 5/2012 | Grainger et al. | |

FOREIGN PATENT DOCUMENTS

| | | |
|---|---|---|
| EP | 1 548 456 | 6/2005 |
| WO | 200246788 | 6/2002 |
| WO | 2010015854 | 2/2010 |

OTHER PUBLICATIONS

International Search Report and Written Opinion of the International Searching Authority, PCT Application Serial No. PCT/US2011/059998, Feb. 8, 2012, 13 pages.

* cited by examiner

*Primary Examiner* — Nimesh Patel
(74) *Attorney, Agent, or Firm* — Fish & Richardson P.C.

(57) ABSTRACT

Methods, program products, and systems for multi-tier geofence detection are disclosed. In general, in one aspect, a mobile device can be configured to perform a task when the mobile device enters a geographic region. The mobile device can monitor a current location using a multi-tier approach. A baseband subsystem can monitor a coarse location of the mobile device using various course location parameters, such as a mobile country code (MCC), a location area code (LAC), or a cell identifier (cell ID), as the mobile device moves closer to the geographic region. Upon determining that the mobile device is in a cell that intersects the geographic region, the baseband subsystem can transfer the monitoring to the application subsystem. The task can be performed when the application subsystem determines that the mobile device is currently located in the geographic region.

18 Claims, 10 Drawing Sheets

MULTI-TIER GEOFENCE DETECTION

TECHNICAL FIELD

This disclosure relates generally to location-based processing on a mobile device.

BACKGROUND

A modern mobile device can incorporate functions of a computer, of a cellular transceiver, or a wireless (e.g., WiFi™) transceiver. For example, the mobile device can perform traditional computer functions, such as executing application programs, storing various data, and displaying digital images. These functions can be performed in an application subsystem of the mobile device. The application subsystem can include an application processor, an application operating system, and various input/output devices.

When the mobile device functions as a cellular transceiver, the mobile device can initiate and receive phone calls, send and receive data over a cellular network, identify cellular tower connections, and determine when and whether to switch cellular towers. Similarly, the mobile device can function as a wireless radio transceiver and send and received data over a wireless network, e.g. a WiFi™ network. These radio-related functions can be performed in a baseband subsystem of the mobile device. The baseband subsystem can include a baseband processor and a baseband operating system. The baseband processor can be an integrated circuit (IC) device (e.g., a Large Scale Integrated Circuit (LSI)) that performs communication functions. The baseband processor can include, for example, a Global System for Mobile Communications (GSM) modem. The baseband processor can be can be integrated with the application processor in a System-on-Chip (SoC). In general, the application subsystem can consume more power than the baseband subsystem when activated.

SUMMARY

Methods, program products, and systems for multi-tier geofence detection are disclosed. In general, in one aspect, a mobile device can be configured to perform a task when the mobile device enters a geographic region. The mobile device can monitor a current location using a multi-tier approach. A baseband subsystem can monitor a coarse location of the mobile device using a mobile country code (MCC), a location area code (LAC), or a cell identifier (cell ID), as the mobile device moves closer to the geographic region. The baseband subsystem can notify an application subsystem when the mobile device moves sufficiently close to the geographic region such that monitoring the location in finer location accuracy is warranted. Upon determining that the mobile device is in a cell that intersects the geographic region, the baseband subsystem can transfer the monitoring to the application subsystem. The mobile device can determine that the mobile device enters the geographic region by triangulating locations of access points of a wireless local area network (WLAN) or by using position coordinates from a global positioning system (e.g., GPS). The task can be performed based on the determination that the cell intersects the geographic region.

In another aspect, the mobile device can be configured to detect whether the mobile device has crossed a geofence to enter a geographic region using multi-tier detection. The mobile device can receive a request to perform a task. The request can specify that the task is to be performed when the mobile device is located in a predefined first geographic region. The first geographic region can be defined using a first location accuracy. The mobile device can monitor a current location of the mobile device using a second location accuracy. The second location accuracy initially can be less precise than the first location accuracy. The mobile device can determine that the mobile device is located in a second geographic region. The second geographic region can be specified using the second granularity and can include at least a portion of the first geographic region. The mobile device can refine the second location accuracy upon the determining that the mobile device is in the second geographic region. The mobile device can continue a cycle of monitoring, determining, and refining until an exit condition is satisfied. Upon determining that the mobile device is located in the first geographic region, the mobile device can perform the requested task.

The multi-tier geofence detection techniques can be implemented to achieve the following exemplary advantages. On a mobile device, a baseband subsystem can consume less power than an application subsystem. Multi-tier geofence detection can be achieved in the baseband subsystem until participation of the application subsystem is needed. The "as needed" approach allows the application subsystem to be set to a power-saving mode until the mobile device is sufficiently close to the geofence, thus saving battery power. Likewise, the application programs that can determine a more precise location of the mobile device than country, location area, and cell can be invoked only when necessary. For example, location triangulation functions or GPS processing, which can be resource intensive in terms of signal detection and CPU processing cycles, can be invoked when the mobile device is sufficiently close to the geofence, thus saving computing resources of the mobile device.

The details of one or more implementations of multi-tier geofence detection are set forth in the accompanying drawings and the description below. Other features, aspects, and advantages of multi-tier geofence detection will become apparent from the description, the drawings, and the claims.

DETAILED DESCRIPTION

Overview of Multi-tier Geofence Detection

Figure 1:
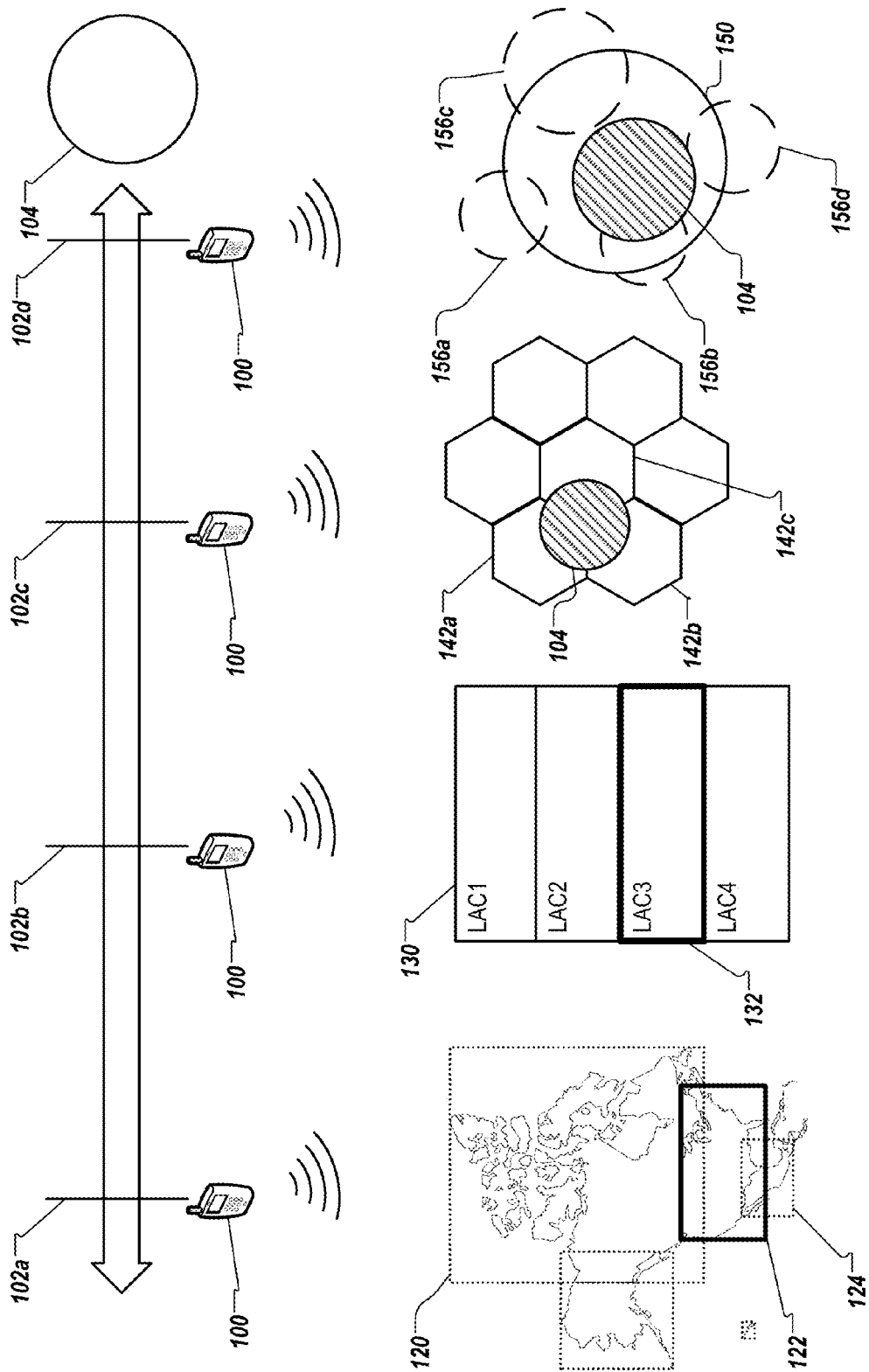
FIG. 1 is an overview of techniques of multi-tier geofence detection.

FIG. 1 is an overview of techniques of multi-tier geofence detection. Mobile device 100 can be an exemplary mobile device that implements the techniques of multi-tier geofence detection. In FIG. 1, mobile device 100 is configured to perform one or more tasks when mobile device 100 is located in geographic region 104. Geographic region 104 can be defined using a geofence. The geofence can be a boundary configured on a server computer or on a mobile device (e.g., mobile device 100). The geofence can be a circle, a polygon, or any geographic shape that encloses geographic region 104. Geographic region 104 can correspond to, for example, an office, a floor of a building, a building, a block of buildings, a city, a state, etc. The task to be performed can include, for example, launching an application program, setting certain files to non-accessible mode, initiating a phone call, sounding an alarm, among others. For illustration of multi-tier geofence detection, geographic region 104 is located in the United States.

As mobile device 100 moves towards or away from geographic region 104 (distance 102a-d), mobile device 100 can use various ways to determine whether mobile device 100 is located inside geographic region 104. The determination can use multi-tier detection. As closer mobile device 100 moves toward geographic region 104, more precise location determination mechanism can be used to determine the current location of mobile device 100. For example, when mobile device 100 is close to geographic region 104 (distances 102d), a more precise location monitoring determination mechanism (e.g., using triangulation of wireless access points or GPS) can be used. The precise location monitoring determination mechanism can be executed in an application subsystem, which generally can consume more power than a baseband subsystem. Therefore, it can be more power efficient to use the baseband subsystem to monitor the location until mobile device 100 is close to geographic region 104 to warrant the use of more precise location monitoring mechanisms.

When mobile device 100 is far away from geographic region 104 (distances 102a), mobile device 100 can monitor a MCC of a cellular network. Based on the MCC, mobile device 100 can determine in which country mobile device 100 is located. Monitoring the MCC can be accomplished in the baseband subsystem of mobile device 100. The application subsystem can register one or more MCCs (e.g., MCCs of the United States, represented as polygon 122) associated with geographic area 104 to the baseband subsystem. The baseband subsystem can constantly or intermittently monitor a current MCC of mobile device 100. For example, when a current MCC indicates that mobile device 100 is located in Canada (e.g., in polygon 120), or that mobile device 100 is located in Mexico (e.g., in polygon 124), the baseband subsystem need not request further information from the application processor of mobile device 100.

When mobile device 100 moves into polygon 122 containing the United States (e.g., when mobile device 100 is at distance 102b from geographic region 104), the baseband subsystem of mobile device 100 can invoke or notify the application subsystem of mobile device 100 to request location information that has more precise location accuracy. The application subsystem can provide to the baseband subsystem one or more LACs 130. LAC 130 can represent a location area that includes one or more radio cells in a cellular communications network. Each location area can correspond to a unique LAC 130. In FIG. 1, geographic region 104 is located in an exemplary location area represented by LAC 132. A single task can be configured to be performed when mobile device is located in multiple geographic regions 104. Likewise, multiple tasks can be configured to be performed when mobile device 100 is located in a single geographic region 104. Each geographic region 104 can be located in multiple countries or location areas.

The baseband subsystem of mobile device 100 need not seek further information from the application subsystem of mobile device 100 until mobile device 100 is located in the location area or location areas in which geographic region 104 is located. Mobile device 100 can determine that mobile device 100 is located in a location area when mobile device 100 determines that a current LAC matches LAC 132 ("LAC3").

When mobile device 100 is located closer to geographic region 104 (e.g., at distance 102c), location of mobile device 100 can be measured using finer location accuracy. For example, upon determining that mobile device 100 is in the location area where geographic region 104 is located, the baseband subsystem of mobile device 100 can notify the application subsystem of the LAC (e.g., LAC 132). The application subsystem of mobile device 100 can request, from a server or from a data store on mobile device 100, one or more cell IDs. The cell IDs can include unique identifiers of cell towers (also known as cell sites, which can include antennae and electronic communications equipments for creating a cell in a cellular network). The cells can correspond to (e.g., intersect) geographic region 104. Geographic region 104 can intersect multiple cells (e.g., cell 142a, 142b, and 142c). The server can send cell IDs of all cells intersecting geographic region 104 to mobile device 100. Mobile device 100 can register these cell IDs with the baseband subsystem. The baseband subsystem can monitor in which cell mobile device 100 is currently located. When the baseband subsystem detects that mobile device 100 is located in one of the cells that intersect with geographic region 104, the baseband subsystem can invoke the application subsystem and notify the application subsystem of the current cell ID.

An advantage of multi-tier geofence detection is conservation of resources in the baseband subsystem of mobile device 100. Mobile device 100 can be configured to perform multiple tasks, each task being associated with multiple geographic regions, and each region being associated with multiple cells. The baseband subsystem of mobile device 100 can have a limited amount of memory for registering cell IDs, therefore a limit on how many cell IDs can be registered. Using filters (e.g., MCC and LAC) can reduce the number of cell IDs that are registered concurrently, thus allowing mobile device 100 to be configured to perform more location based tasks. In addition to using tiers based on MCC and LAC, other tiers (e.g., a tier based mobile network code (MNC)) can be used to detect geofences.

The application subsystem can continue monitoring the current location of mobile device 100 with finer location accuracy then cells of a cellular network, which can have a location accuracy measured in kilometers. For example, the application subsystem can continue monitoring the current location of mobile device 100 using GPS, or by triangulation using WLAN access points. To triangulate the current location of mobile device 100, mobile device 100 can request from a server (or query a database on mobile device 100) one or more identifiers (e.g., Media Access Control (MAC) addresses) of WLAN access points. The identifiers can be associated with geographic locations of the WLAN access points. Mobile device 100 can detect the MAC addresses of the WLAN access points located within a communication range of mobile device 100. Mobile device 100 can calculate current location 150 based on locations 156a, 156b, 156c, and 156d of the WLAN access points. The application subsystem can perform the task associated with geographic region 104 when current location 150 intersects (e.g., completely or partially includes or is completely or partially included in) geographic region 104.

Exemplary Tiers of Multi-tier Geofence Detection

Figure 2:
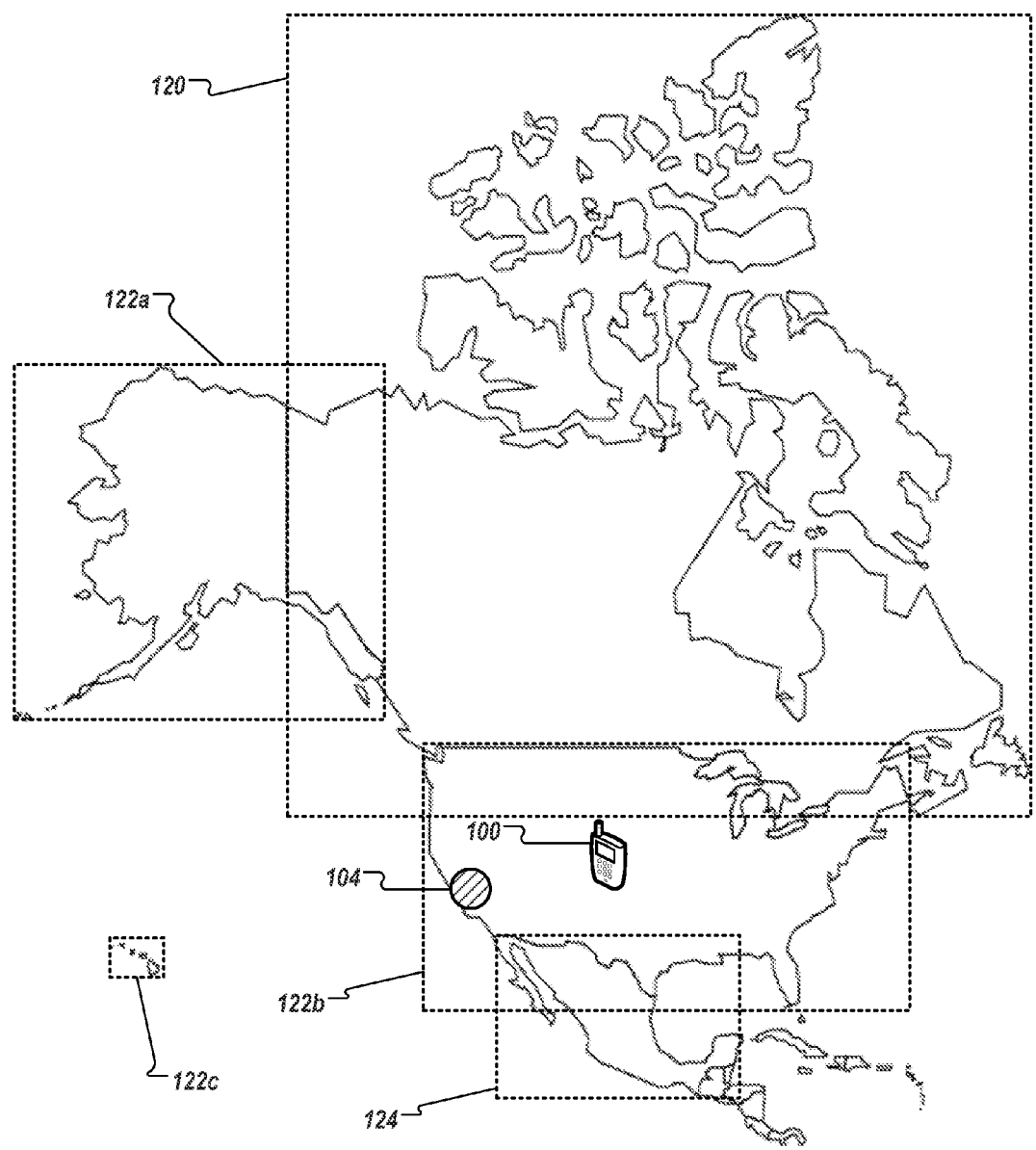
FIG. 2 illustrates an exemplary tier of geofence detection where mobile country code (MCC) is used to determine a coarse location of a mobile device.

FIG. 2 illustrates an exemplary tier of geofence detection where MCC is used to determine a coarse location of mobile device 100. For convenience, only North America and Hawaiian Islands are shown in FIG. 2. Furthermore, only Canada, United States, and Mexico are given as examples for coarse location determination using MCC. The techniques of location filtering using MCC is applicable to other countries and continents.

Mobile device 100 can detect, using a baseband subsystem, a current MCC of mobile device 100. The current MCC of mobile device 100 can be obtained from a specialized processor that is responsible for wireless communications and control. In various implementations, the specialized processors can be known as baseband processors, GSM wireless modems, and universal mobile telecommunications system (UMTS) wireless modems. An MCC is a code that the International Telecommunication Union (ITU) assigned to a country. The MCC is unique for each country and can be used to identify the country. Each country can have one or more MCCs assigned to it. Table 1 illustrates some example MCCs and corresponding countries of FIG. 2.

TABLE 1

Exemplary MCCs

| MCC | Country |
|---|---|
| 302 | Canada |
| 310-316 | United States of America |
| 334 | Mexico |

To determine whether geographic region 104 is associated with a particular MCC, a system can generate polygons that are bounding boxes of the country of each MCC and determine whether geographic region 104 intersects the polygon or polygons of the MCC. For example, bounding box 120 can correspond to MCC "302" (Canada). Bounding boxes 122 can correspond to MCCs "310," "311," "312," "313," "314," "315," and "316" (United States). Bounding box 124 can correspond to MCC "334" (Mexico). For simplicity, bounding boxes for other North American countries are not shown in FIG. 1. A system (either mobile device 100, or a server device connected to mobile device 100 through a communications network, or both) can determine which MCC is to be associated with geographic region 104. For example, geographic region 104 can have a center with latitude and longitude coordinates 37°47'27.56"N and 122°24'08.69"W, indicating that geographic region 104 is located at 300 Bush Street, San Francisco, Calif., U.S.A. This location is inside bounding box 122 for the United States. Therefore, geographic region 104 can be associated with MCCs "310," "311," "312," "313," "314," "315," and "316."

The system can use various algorithms to determine a bounding box (e.g., bounding box 122) of a country associated with an MCC. A country (e.g., Canada) can be represented as one or more simple polygons whose vertices can be stored in latitude and longitude coordinates. The bounding box of a country can be a convex hull of the simple polygon of the country determined by, for example, Akl-Toussaint heuristics or Melkman's Algorithm. In some implementations, a bounding box of a country can be determined by extreme points within the boundaries of the country (e.g., easternmost, westernmost, northernmost, and southernmost points). The bounding box can be a substantially rectangular area (e.g., rectangles 120, 122 and 124) on a map drawn using Mercator projection. The bounding box can be stored using latitude/longitude coordinates of two points (e.g., its north-west vertex and its southeast vertex).

For example, bounding box 120 enclosing Canada can have a northern boundary that is delineated by latitude 83°08'N, corresponding to the latitude of Cape Columbia, Ellesmere Island, Nunavut, an extreme north point within the Canadian boundary. Bounding box 120 can have a southern boundary delineated by latitude 41°41'N, corresponding to the latitude of Middle Island, Ontario, an extreme southern point of Canada. Bounding box 120 can have an eastern boundary delineated by longitude 52°37'W (Cape Spear, Newfoundland), and a western boundary delineated by longitude 141°00'W (Yukon-Alaska border). Bounding box 120 can be stored in two sets of coordinates (e.g., 83°08'N/141°00'W and 41°41'N/52°37'W).

Some countries (e.g., the United States) can be represented as multiple simple polygons (e.g., Alaska, 48 continental states, and Hawaii). Countries that can be represented using multiple simple polygons can have multiple bounding boxes (e.g., bounding boxes 122a for Alaska, bounding box 122b for continental 48 states, and bounding box 122c for Hawaii). Bounding boxes of various countries can overlap, as shown in the overlapping areas between bounding boxes 120 and 122a, for example.

Bounding boxes can be stored on mobile device 100 in association with MCCs, or on a server. For example, mobile device 100 can store, or be connected to, a geographic database, in which MCCs and corresponding bounding boxes are stored. MCC "302" (Canada) can be associated with the north-west vertex and southeast vertex of bounding box 120, for instance.

Figure 3:
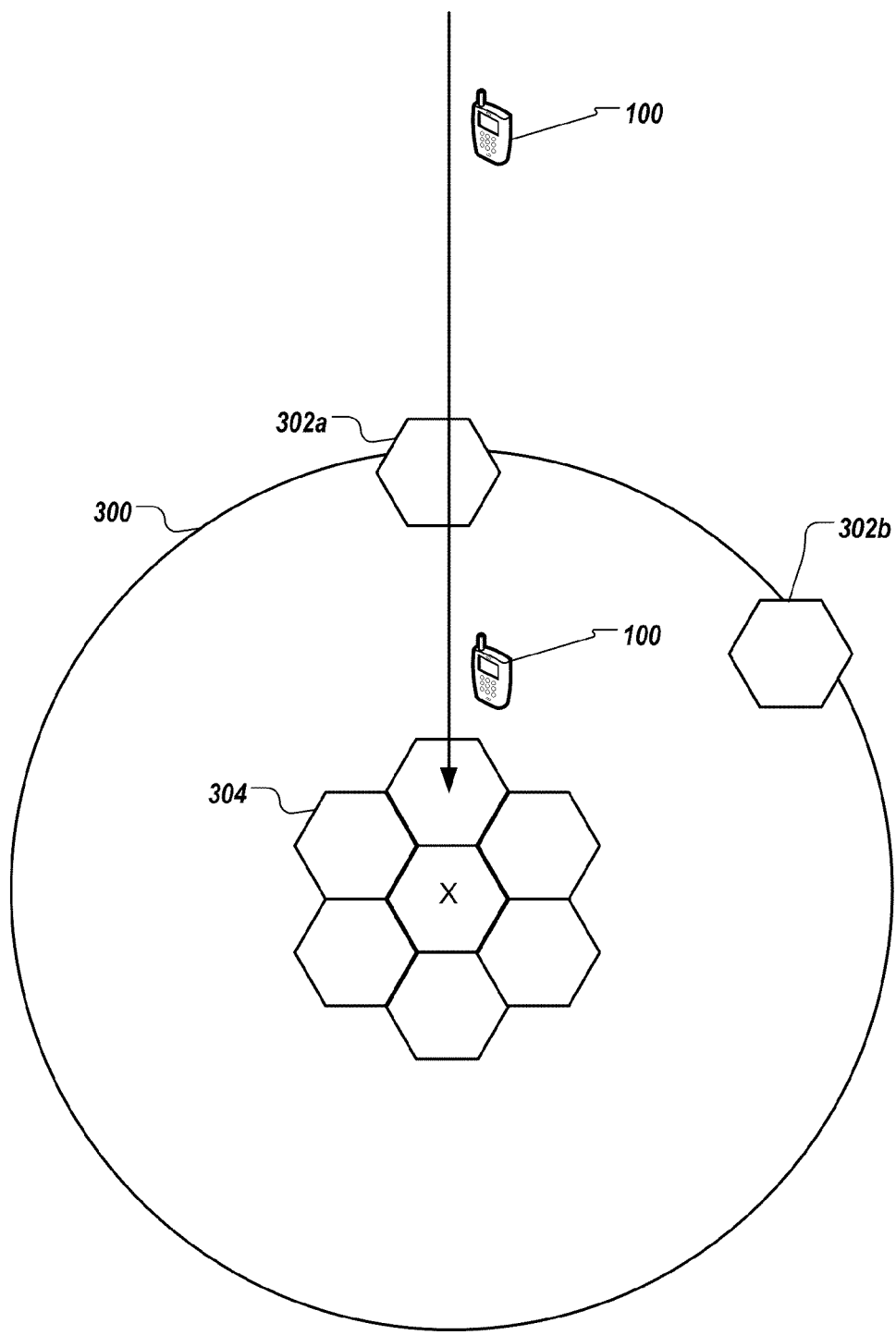
FIG. 3 illustrates an exemplary tier of geofence detection where a mobile device is configured to monitor multiple cells of a cellular communications network.

FIG. 3 illustrates an exemplary tier of geofence detection where mobile device 100 is configured to monitor multiple cells of a cellular communications network. Mobile device 100 can be configured to perform certain tasks when mobile device is located in geographic region 300. Geographic region 300 can be sufficiently large such that geographic region 300 is associated with multiple cells (e.g., cells 302a, 302b, and 304). Due to memory limitations of the baseband subsystem of mobile device 100, not all cells 302a, 302b, and 304 can be registered with the baseband subsystem of mobile device 100.

Mobile device 100 can select a subset of cells to register when the memory limitation prevents mobile device 100 from registering all cells. In some implementations, a cell can be selected based on distances between the cell and a center of geographic region 300. The cells can be sorted based on a distance between each of the cells and the center (marked as an "X" in FIG. 3) of geographic region 300. The distance between a cell (e.g., cell 304) and the center can be measured using a distance between an estimated position of the cell and the center. The estimated position of the cell can be determined by, for example, an average of locations of location-aware mobile devices when the location-aware mobile devices are connected to the cell. The estimated position can coincide with the actual geographic location of the cell tower of the cell. The cell can also have an estimated size, which can be determined mathematically by a distribution of the locations of the location-aware mobile devices.

Mobile device 100 can register cell IDs of cells that are closest to the center of geographic region 300. Cells that are far away from the center (e.g., cells 302a and 302b) can be excluded. Thus, when mobile device 100 moves toward geographic region 300, the baseband subsystem of mobile device 100 can ignore cells 302a and 302b. The baseband subsystem of mobile device 100 can notify the application subsystem of mobile device 100 when mobile device 100 enters one of the cells (e.g., cell 304) that is close to the center of geographic region 300.

Figure 4:
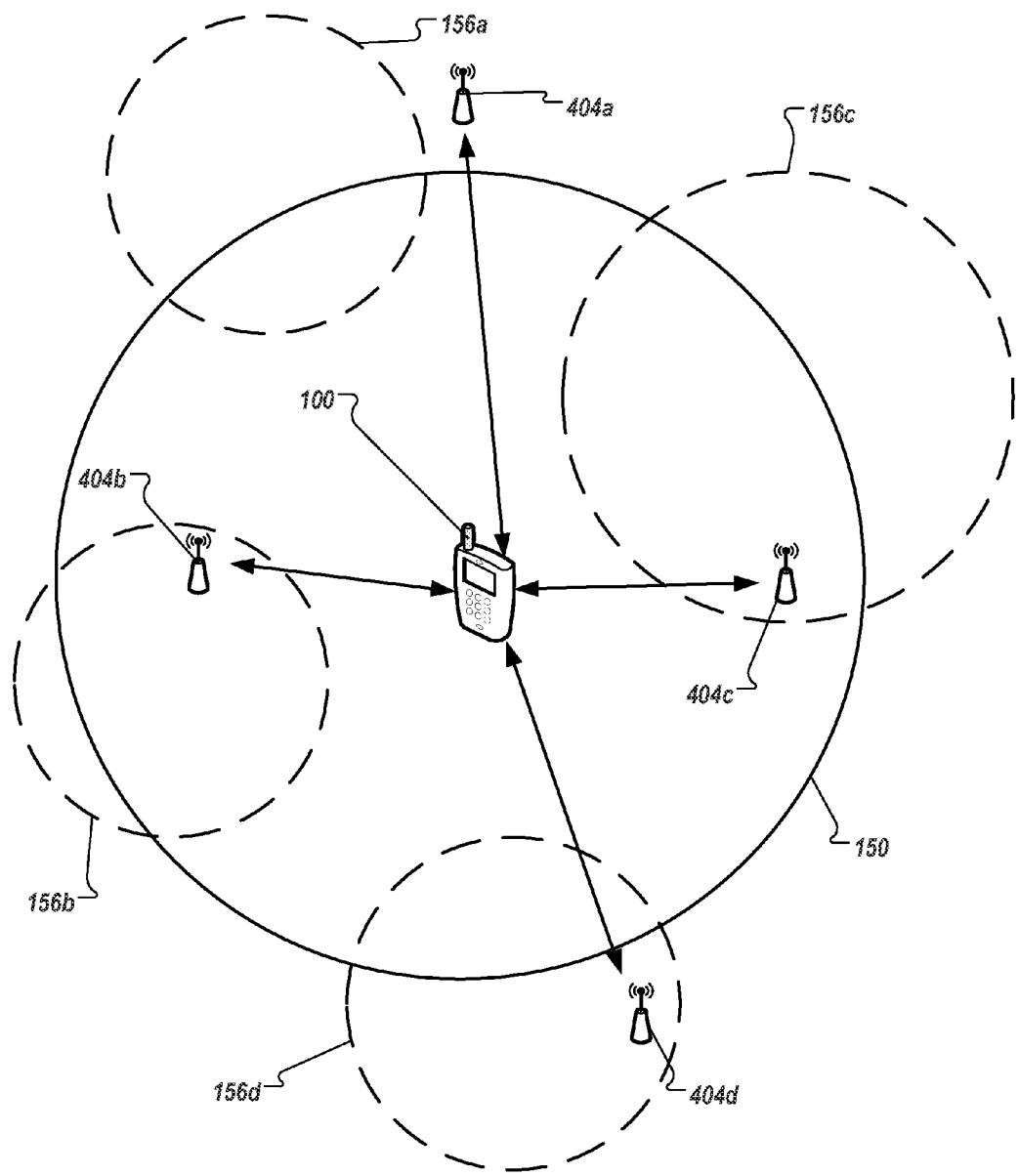
FIG. 4 illustrates an exemplary tier of geofence detection where access points of a wireless local area network (WLAN) are used to determine a current location of a mobile device.

FIG. 4 illustrates an exemplary tier of geofence detection where access points of a wireless local area network (WLAN) are used to determine a current location of mobile device 100. The exemplary tier of geofence detection of FIG. 4 can be performed by an application subsystem of mobile device 100.

Mobile device 100 can be located within communication range of access points 404a-d. Mobile device 100 can be connected to one of the access points 404a-d (e.g., 404a). From access point 404a, mobile device 100 can receive data that includes information on the locations (including locations 156a-d) of access points 404a-d. Mobile device 100 can store the received data on a storage device (e.g., a flash memory device) coupled to mobile device 100. The stored data can be updated periodically.

Mobile devices 100 can identify access points 404a, 404b, 404c, and 404d under wireless communication protocols used in the WLAN (e.g., IEEE 802.11x). Access points 404a, 404b, 404c, and 404d can be identified by MAC addresses of the access points or other identifiers (e.g., Bluetooth™ identifiers).

Mobile device 100 can identify locations 156a, 156b, 156c, and 156d that are associated with access points 404a-d, respectively. Identifying locations 156a, 156b, 156c, and 156d can include retrieving information on the locations 156a, 156b, 156c, and 156d from the memory device coupled to mobile device 100. In some implementations, mobile device 100 can request from a server the locations 156a, 156b, 156c, and 156d by querying the server using identifiers of access points 404a-d. Locations 156a, 156b, 156c, and 156d need not be the actual, physical locations of access points 404a-d. Locations 156a, 156b, 156c, and 156d can be areas that are determined by the server to be areas where mobile devices that are connected to access points 404a-d are most likely to be present.

Based on locations 156a-d, mobile device 100 can execute an iterative process (e.g., a multi-pass analysis). The iterative process can calculate an average locations 156a-d, select a subset of locations 156a-d that are closest to the average, and calculate the average again, and so on, until a desired precision is reached or until only a certain number of locations 156a-d are left. The iterative process can produce geographic area 150, which can be an estimate of the current geographic location of mobile device 100. Geographic area 150 can be a geographic space (e.g., a particular floor in a building) when three-dimensional location information is utilized. Mobile device 100 can perform a task associated with geographic region 104 when geographic area 150 intersects geographic region 104.

Exemplary Components of Multi-tier Geofence Detection

Figure 5:
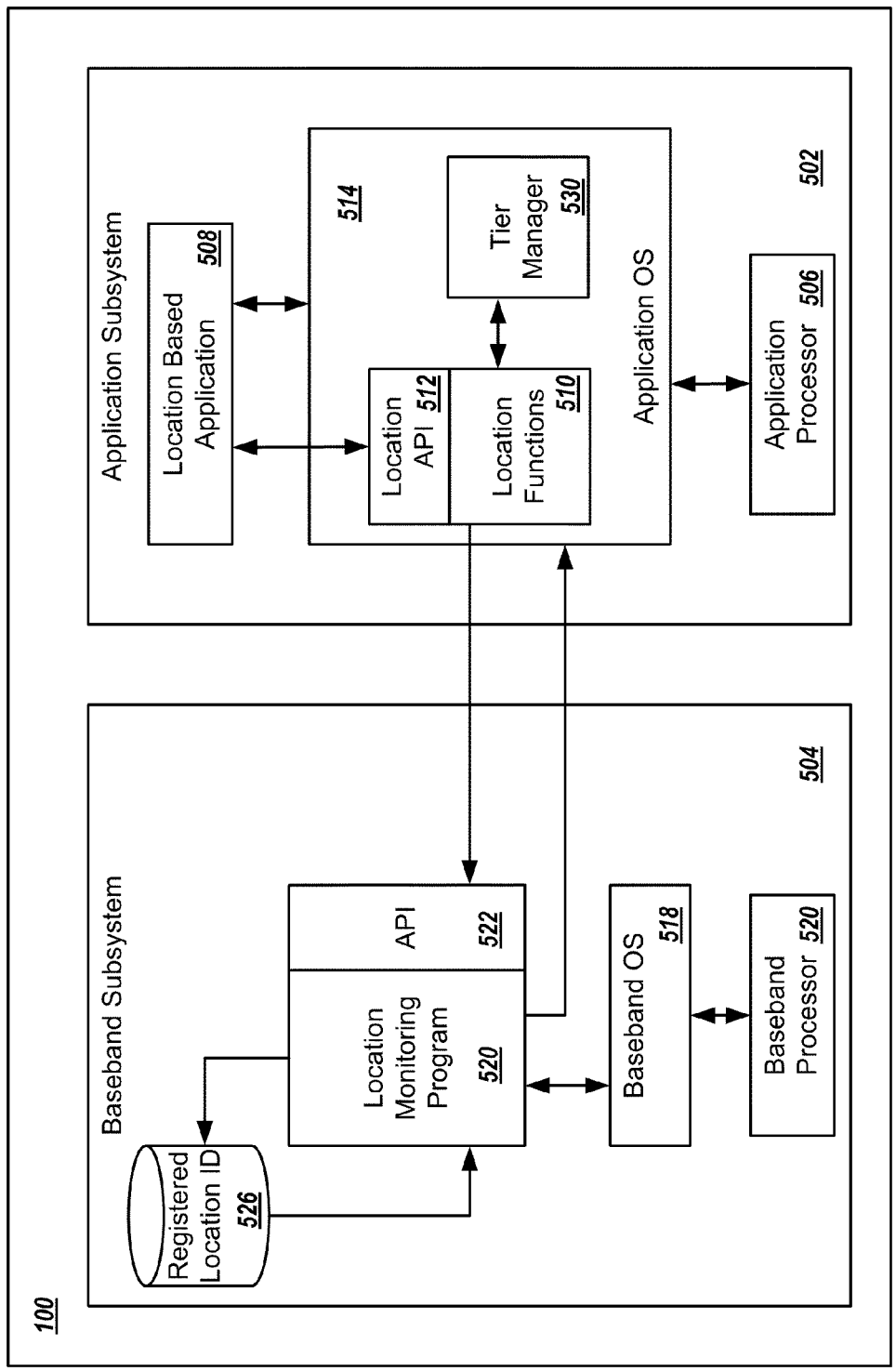
FIG. 5 is a block diagram illustrating various modules of a mobile device configured to utilize techniques of multi-tier geofence detection.

FIG. 5 is a block diagram illustrating various modules of mobile device 100 configured to utilize techniques of multi-tier geofence detection. Mobile device 100 can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile device 100 can include, among other components, application subsystem 502 and baseband subsystem 504. Application subsystem 502 can include application operating system 514, and application processor 506. One or more application programs 508 can execute in application subsystem 502. Application programs 508 can be location-based (e.g., configured to be invoked or notified when mobile device 100 is at or near a geographic region). Application operating system 514 can include various location functions 510. Location functions 510 can include, for example, functions that can retrieve current geographic location from a GPS receiver, and functions for communicating with baseband subsystem 504. Location functions 510 can be exposed to application programs 508 through location API 512. Location API 512 can have a public interface that allows development of "crowdware." Crowdware can include user generated software (e.g., miniature application programs or widgets) that can be invoked when mobile device 100 is located in a particular geographic region (e.g., geographic region 104).

Location functions 510 can communicate with location monitoring program 520 of baseband subsystem 504. In some implementations, location monitoring program 520 can be exposed to location functions 510 through API 522. Baseband subsystem 504 can include baseband operating system 518 and baseband processor 520.

Location functions 510 can register various location identifiers with location monitoring program 520. The location identifiers can include multi-tiered information, including MCC, MNC, LAC, cell ID, or other identifiers of wireless access gateways. The location identifiers can be stored in registered location identifier data store 526. Location monitoring program 520 can monitor a current wireless access gateway. Monitoring the current wireless access gateway can include monitoring a current MCC, MNC, LAC, cell ID, or other identifiers of wireless access gateways using the baseband operating system 518 and baseband processor 520 of mobile device 100. Upon receiving information on the wireless access gateway, location monitoring program 520 can compare the received information with the location identifiers in data store 526. If a match is found, location monitoring program 520 can pass the matched identifier to application operating system 514 of the application subsystem 502.

Application operating system 514 can determine a next action based the received identifier, using tier manager 530. Tier manager 530 can determine whether the received identifier requires more granular monitoring, or is sufficient to trigger an invocation or notification of location based application program 508. For example, if location based application program 508 is associated with a geographic region that has location accuracy at cell level, and the identifier received from baseband subsystem corresponds to the geographic region, tier manager 530 can inform location functions 510 that location based application program 508 can be invoked or notified.

If the received identifier is a higher-level identifier (e.g., an MCC or a LAC) that identifies a geographic region that has a lower location accuracy than defined for the geographic region associated with location based application program 508, tier manager 530 can determine that finer granulated monitoring is necessary. Tier manager 530 can re-register with baseband subsystem 504 using the identifier of a next tier. For example, when location monitoring program 520 identifies a matching LAC, tier manager 530 can provide cell IDs of one or more cells in the LAC for monitoring. The one or more cells can be cells that intersect with the geographic region that is associated with location based application 508.

Exemplary Multi-tier Geofence Detection Processes

Figure 6:
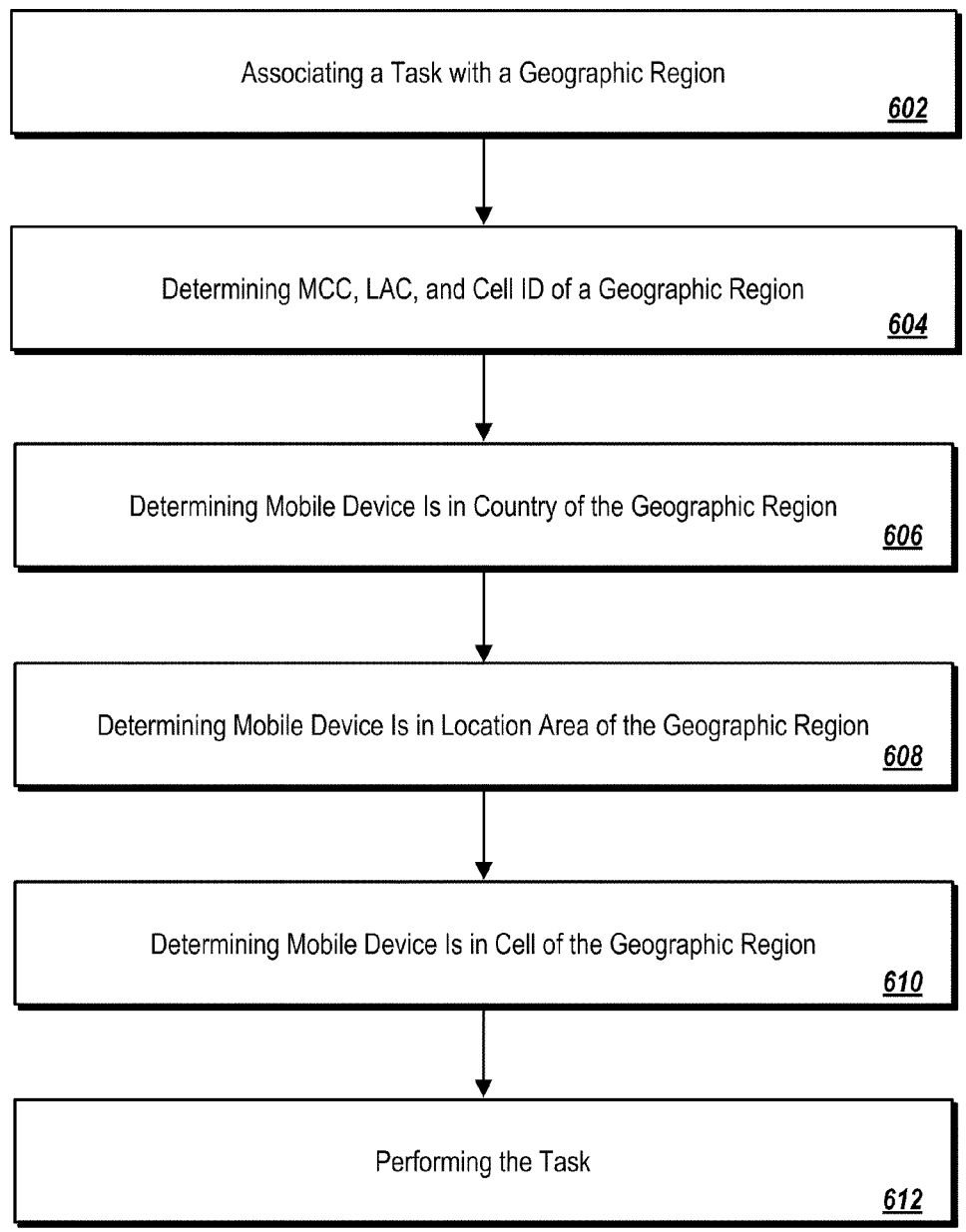
FIG. 6 is a flowchart illustrating an exemplary process implementing multi-tier geofence detection techniques.

FIG. 6 is flowcharts illustrating exemplary process 600 implementing multi-tier geofence detection techniques. For convenience, exemplary process 600 will be described with respect to mobile device 100 that implements exemplary process 600.

A task can be associated (602) with a geographic region. The task can be an application program (e.g., application program 508) that executes in a first subsystem (e.g., application subsystem 502) of mobile device 100, or a function (e.g., making a phone call) that executes in a second subsystem (e.g., baseband subsystem 504), or a combination of both. The geographic region can be a circular area having a center and a radius, or an arbitrary geometric shape. The geographic region can be defined by one or more sets of latitude-longitude coordinates. In some implementations, the geographic region can be a space (e.g., a particular floor of a building, a flight path of an aircraft, or a particular section of a ski area), further defined by one or more altitude parameters.

Mobile device 100 can determine (604) one or more of MCCs, LACs, and cell IDs associated with the geographic region. Determining the MCCs, LACs, and cell IDs can include acquiring the MCCs, LACs, and cell ID from a server, the server connected to mobile device 100 through a wired or wireless communications network. In some implementations, acquiring the MCCs, LACs, and cell ID from the server can include requesting the MCCs, LACs, and cell ID from the server by sending the geographic coordinates of the geographic region to the server. Determining the MCCs, LACs, and cell IDs can include registering the MCCs with baseband subsystem 504 of mobile device 100.

Mobile device 100 can determine (606) that mobile device 100 is in the country of the geographic region. Determining that mobile device 100 is in the country of the geographic region can include monitoring a current MCC of mobile device 100 using baseband subsystem 504 of mobile device 100, comparing the current MCC with the registered MCCs, and notifying application subsystem 502 of mobile device 100 if a match is found.

Upon being notified of the matching MCC, mobile device 100 can register one or more LACs with baseband subsystem 504. The LACs can be LACs that are located within the country represented by the MCC and associated with the geographic region. Mobile device 100 can determine (608) that mobile device 100 is in the location area of the geographic region. Determining that mobile device 100 is in the location area of the geographic region can include monitoring a current LAC of mobile device 100 using baseband subsystem 504 of mobile device 100, comparing the current LAC with the registered LACs, and notifying application subsystem 502 of mobile device 100 if a match is found.

Upon being notified of the matching LAC, mobile device 100 can register one or more cell IDs with baseband subsystem 504. The cell IDs can be cell IDs that are located within the location area represented by the LAC and associated with the geographic region. Mobile device 100 can determine (610) that mobile device 100 is in the cell of the geographic region. Determining that mobile device 100 is in a cell of the geographic region can include monitoring a current cell ID of mobile device 100 using baseband subsystem 504 of mobile device 100, comparing the current cell ID with the registered cell IDs, and notifying application subsystem 502 of mobile device 100 if a match is found.

Mobile device 100 can perform (612) the task configured to be performed when mobile device 100 is located in the geographic region upon determining that mobile device 100 is in a cell of the geographic region. Performing the task can include invoking or notifying the application program (e.g., application program 508).

In some implementations, baseband subsystem 504 of mobile device 100 can be configured to notify application subsystem 502 when mobile device 100 leaves the location area of the geographic region or the country of the geographic region. When mobile device 100 leaves the location area of the geographic region or the country of the geographic region, the cells or location areas currently registered with baseband subsystem 504 can be de-registered (e.g., released), freeing memory space of baseband subsystem 504. The freed memory space can be used for registering cell IDs or location areas for other tasks.

Figure 7:
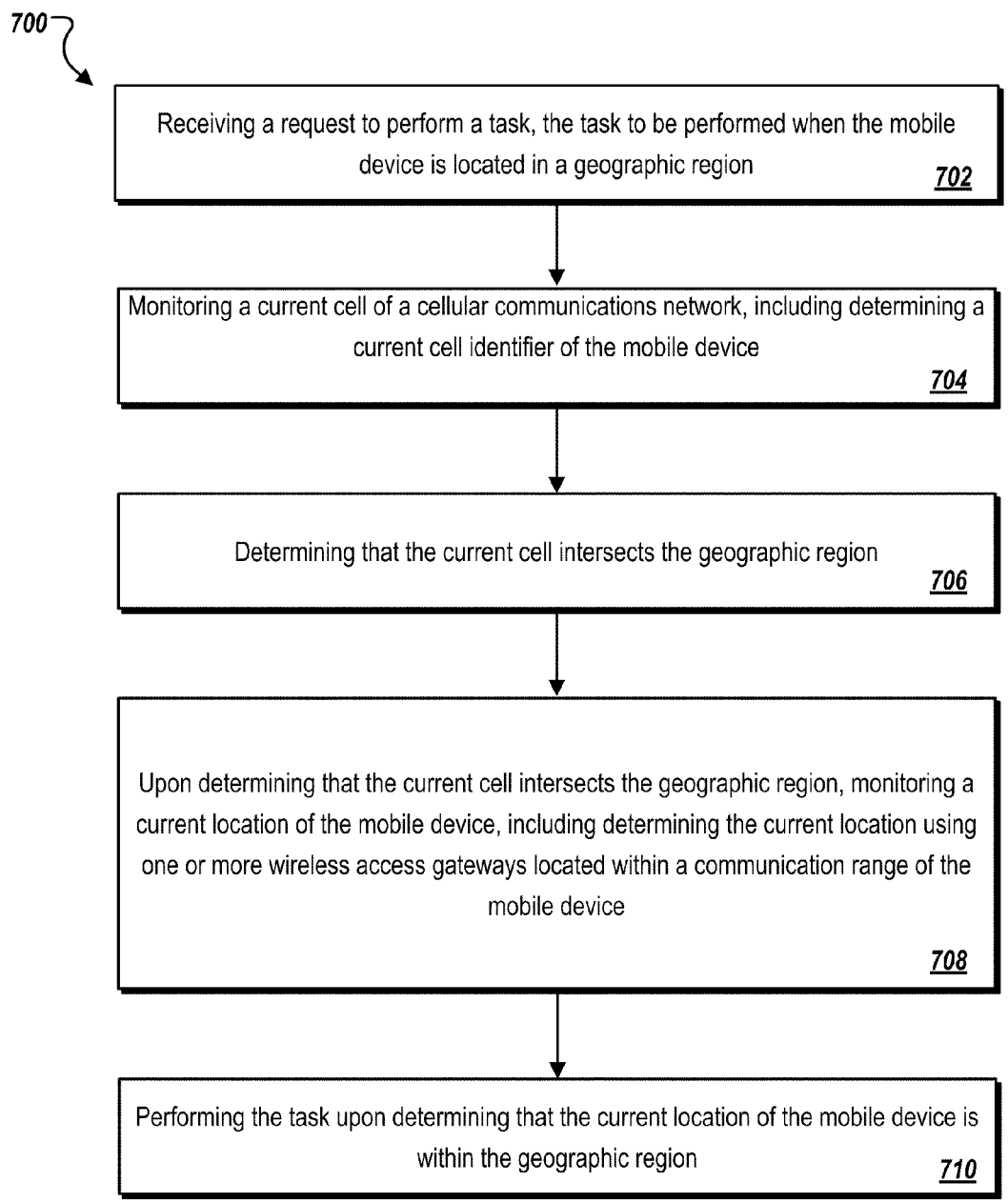
FIG. 7 is a flowchart illustrating another exemplary process implementing multi-tier geofence detection techniques.

FIG. 7 is flowcharts illustrating exemplary process 700 implementing multi-tier geofence detection techniques. For convenience, exemplary process 700 will be described with respect to mobile device 100 that implements exemplary process 700.

Mobile device 100 can receive (702) a request to perform a task when mobile device 100 is located in a geographic region. The request can be associated with an application program (e.g., location based application program 508) that is downloaded from a server, copied from a storage device connected to mobile device 100, or created on mobile device 100. The geographic region can be configured on mobile device 100, or on the server from which the application program is downloaded.

Mobile device 100 can monitor (704) a current cell of a cellular communications network, including determining a current cell ID of mobile device 100. In some implementations, monitoring the current cell of mobile device 100 can include monitoring a current location area of mobile device 100, including determining a current location area code of mobile device 100. Monitoring the current cell of mobile device 100 can further include determining that the current location area intersects the geographic region, and, upon determining that the current location area intersects the geographic region, monitoring the current cell of mobile device 100. A geographic area (e.g., a country, a location area, or a cell) intersects the geographic region if at least a portion of the geographic area is contained in the geographic region.

In some implementations, monitoring the current cell of mobile device 100 can include monitoring a current country of mobile device 100, including determining a current mobile country code of mobile device 100. Monitoring the current cell of mobile device 100 can further include determining that the current country intersects the geographic region, and, upon determining that the current country intersects the geographic region, monitoring a current location area or the current cell of mobile device 100. Determining that the current country intersects the geographic region can include determining that the geographic region intersects one or more polygons corresponding to the current country. Determining the current cell, current location area, and current country can be accomplished using baseband subsystem 504 of mobile device 100.

Mobile device 100 can determine (706) that the current cell intersects the geographic region. Determining that the current cell intersects the geographic region can include comparing the current cell ID with one or more registered cell IDs, the registered cell IDs being associated with the geographic region. Location and area of the current cell can be determined based on historical usage data. For example, the location and area of the current cell can be determined using locations of location-aware mobile devices that are connected to a cell tower of the cell. The location and area of the current cell can by dynamic, determined based on time of day.

Upon determining that the current cell intersects the geographic region, mobile device 100 can monitor (708) a current location of the mobile device on a level that is more detailed than current cell. Monitoring the current location can include determining the current location using one or more wireless access gateways located within a communication range of mobile device 100. In some implementations, determining the current location can include invoking an application program that triangulates the current location based on locations of the one or more wireless access gateways. The application program that performs the triangulation can execute in application subsystem 502 of mobile device 100. The wireless access gateways can include wireless access points of a wireless local area network. Additionally or alternatively, monitoring the current location can include determining the current location using a global positioning system (GPS). Determining the current location using GPS can be performed in application subsystem 502 of mobile device 100.

Mobile device 100 can perform (710) the task upon determining that the current location of the mobile device is within the geographic region. Performing the task can include invoking or notifying an application program (e.g., location-based application 508) in application subsystem 502 from baseband subsystem 504. Likewise, in some implementations, mobile device 100 can perform a task when mobile device leaves a geographic region, a cell, a location area, or a country.

Figure 8:
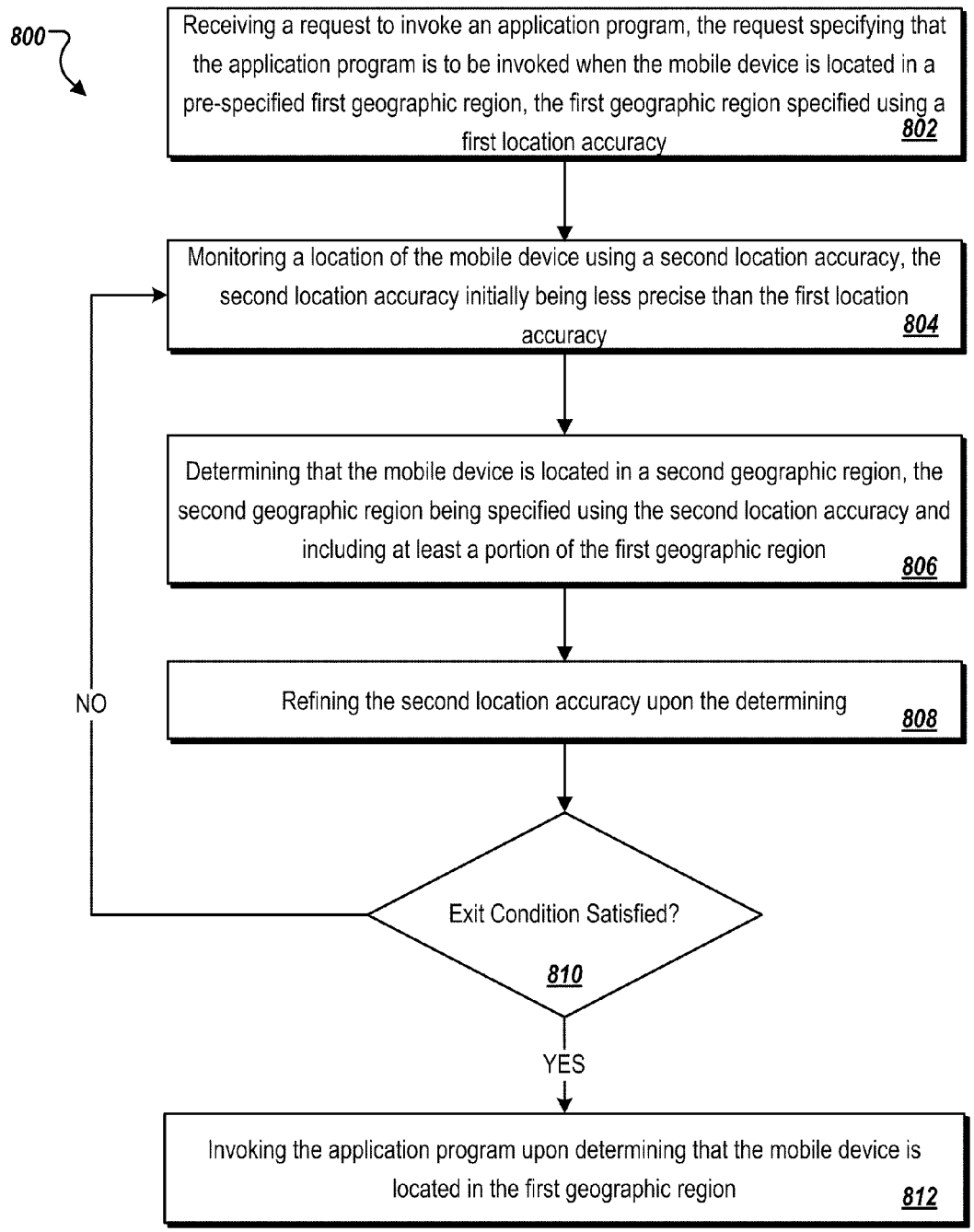
FIG. 8 is a flowchart illustrating an exemplary process of multi-tier geofence detection using various granularities.

FIG. 8 is a flowchart illustrating exemplary process 800 of multi-tier geofence detection using various location accuracies. For convenience, exemplary process 800 will be described with respect to mobile device 100 that implements exemplary process 800.

Mobile device 100 can receive (802) a request to perform a task, the request specifying that the task is to be performed when the mobile device is located in a pre-specified first geographic region. The first geographic region can be specified using a first location accuracy. The first location accuracy can be measured in terms of meters. Measuring a position of mobile device 100 at the first location accuracy can include, for example, triangulating the position of mobile device 100 using WiFi™ or WiMax access points, or using GPS technology.

Mobile device can monitor (804) a current location of mobile device 100 using a second location accuracy. Monitoring the current location of mobile device 100 using the second location accuracy can include monitoring a cell of a cellular network in which mobile device 100 is located, a location area of the cellular network, and a country. The second location accuracy initially can be less precise than the first location accuracy. For example, the second location accuracy can be measured in kilometers, miles, degrees of longitude, etc.

Mobile device 100 can determine (806) that mobile device 100 is located in a second geographic region. The second geographic region can be specified using the second location accuracy. The second geographic region can include at least a portion of the first geographic region. For example, the second geographic can be a location area that encompasses the geographic region.

Mobile device 100 can refine (808) the second location accuracy upon the determining. For example, when mobile device 100 has determined that mobile device 100 is in a country that intersects the geographic region, mobile device 100 can refine the second location accuracy from country to location area. When mobile device 100 has determined that mobile device 100 is in a location area that intersects the geographic region, mobile device 100 can refine the second location accuracy from location areas to cells. When mobile device 100 has determined that mobile device 100 is in a cell that intersects the geographic region, mobile device 100 can refine the second location accuracy from cells to GPS or triangulation.

Mobile device 100 can repeat the monitoring (e.g., stage 804), the determining (e.g., stage 806), and the refining (e.g., stage 808) until an exit condition is satisfied. Mobile device 100 can determine (810) that the exit condition is satisfied when the second location accuracy is equivalent to the first location accuracy, or when mobile device 100 has determined that mobile device 100 is currently located in the geographic region, or both. Mobile device 100 can invoke (812) the application program upon determining that mobile device 100 is located in the first geographic region.

If mobile device 100 moves away from the geographic region, the second location accuracy can be relaxed. For example, if mobile device 100 moves out of a location area in which the first geographic region is located, mobile device 100 can automatically start monitoring location areas instead of cells of the location areas. Likewise, when mobile device 100 moves out of a country in which the first geographic region is located, mobile device 100 can automatically start monitoring countries instead of cells or location areas.

Exemplary Mobile Device Architecture

Figure 9:
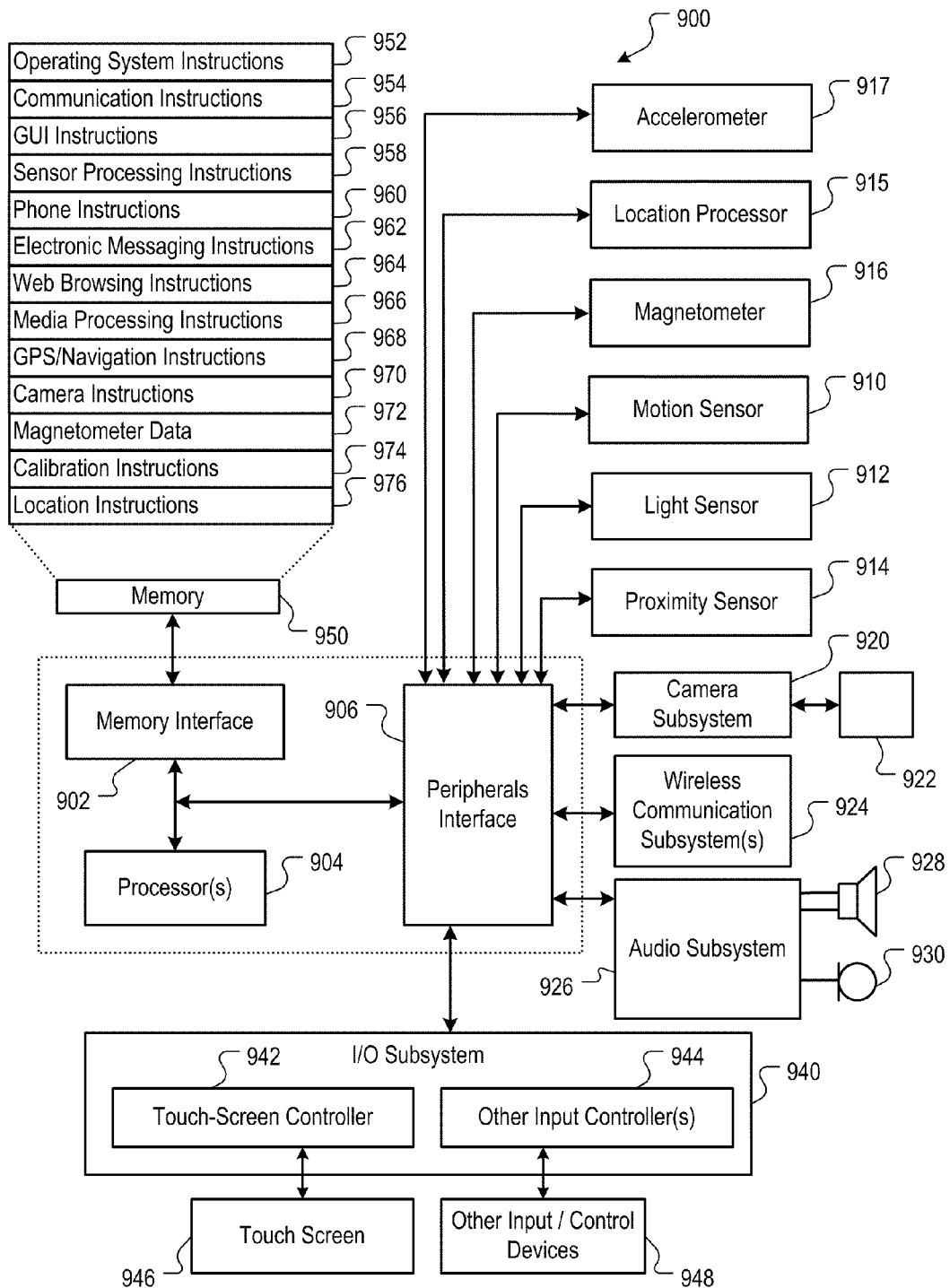
FIG. 9 is a block diagram illustrating an exemplary device architecture of a mobile device implementing the features and operations described in reference to FIGS. 1-8.

FIG. 9 is a block diagram of exemplary architecture 900 for the mobile devices of FIGS. 1-8. A mobile device can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include one or more application processors (APs) and one or more baseband processors (BPs). The application processors and baseband processors can be integrated in one single process chip. The various components in mobile device 100, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metaloxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to mobile device 100 on or off. The user may be able to customize a functionality of one or more of the buttons. The touch screen 946 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player, such as an iPod™ Mobile device 100 may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can include location instructions 976 that can include location functions 510, location monitoring program 520, and tier manager 530.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
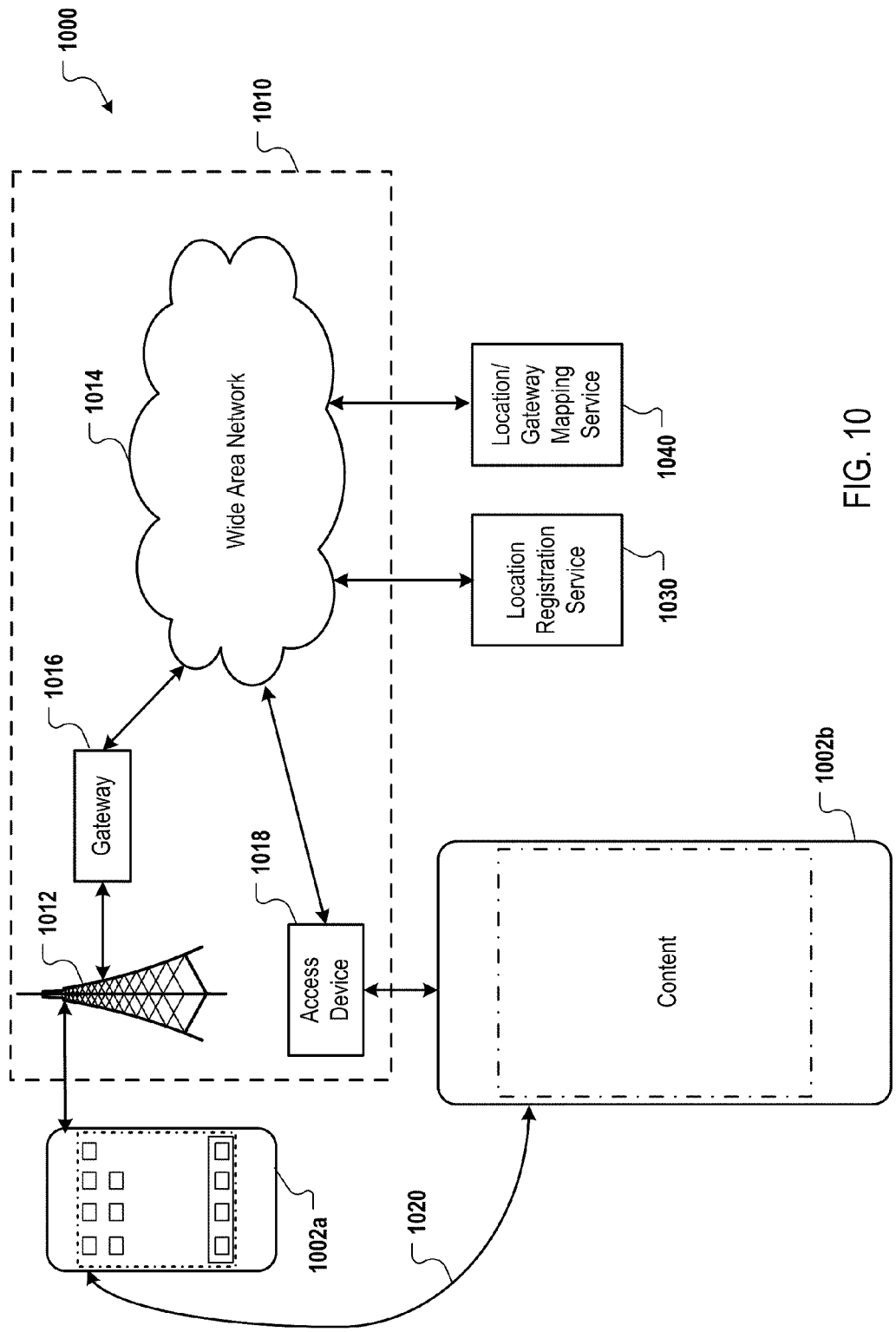
FIG. 10 is a block diagram of an exemplary network operating environment for the mobile devices of FIGS. 1-9.

FIG. 10 is a block diagram of exemplary network operating environment 1000 for the mobile devices of FIGS. 1-9. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access device, can provide communication access to the wide area network 1014.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless device 1002a can communicate with other wireless devices, e.g., other mobile devices 1002a or 1002b, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030 and 1040 over the one or more wired and/or wireless networks. For example, one or more location registration services 1030 can be used to associate application programs with geographic regions. The application programs that have been associated with one or more geographic regions can be provided for download to mobile devices 1002a and 1002b.

Location-gateway mapping service 1040 can determine one or more identifiers of wireless access gateways associated with a particular geographic region, and provide the one or more identifiers to mobile devices 1002a and 1002b for registration in association with a baseband subsystem.

Mobile device 1002a or 1002b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For example, cells are represented as hexagons in the figures. The actual shape of a cell can vary.

What is claimed is:

1. A computer-implemented method, comprising:
receiving, by a mobile device, a request to perform a location-based task, the location-based task comprising operations of executing a program when the mobile device is located in a specified geographic region;
monitoring, using a baseband subsystem of the mobile device while an application subsystem of the mobile device is in a power-saving mode, a current location of the mobile device, including:
comparing at least a portion of a current location identifier received by the baseband subsystem from a cellular network with a first registered location identifier, the first registered location identifier corresponding to a first tier of location granularity and being registered with the baseband subsystem by the application subsystem; and
based on a result of the comparing, activating the application subsystem, wherein the application subsystem comprises an application processor, and the baseband subsystem comprises a baseband processor that consumes less power than the application subsystem when the application subsystem is activated;
triggering, by the application subsystem upon being activated, a change of location monitoring, the change of location monitoring including at least one of:
registering, at the baseband subsystem, a second location identifier corresponding to a second tier of location granularity for monitoring a current location; or
transferring location monitoring to the application subsystem; and
performing the task by the mobile device upon determining, by either the baseband subsystem or the application subsystem, that the current location of the mobile device is within the geographic region.

2. The method of claim 1, wherein the received current location identifier comprises a current location area code, the first registered location identifier comprises a registered location area code, and monitoring the current location of the mobile device by the baseband subsystem includes:
comparing the current location area code with the registered location area code; and
upon determining that the current location area code matches the registered location area code, activating the application subsystem of the mobile device.

3. The method of claim 1, wherein the received current location identifier comprises a current mobile country code, the first registered location identifier comprises a registered mobile country code, and monitoring the current location of the mobile device by the baseband subsystem includes:
comparing the current mobile country code with the registered mobile country code; and
upon determining that the current mobile country code matches the registered mobile country code, activating the application subsystem.

4. The method of claim 1, wherein the received current location identifier comprises a current mobile network code, the first registered location identifier comprises a registered mobile network code, and monitoring the current location of the mobile device by the baseband subsystem includes:
comparing the current mobile network code with the registered mobile network code; and
upon determining that the current network code matches the registered network country code, activating the application subsystem.

5. The method of claim 1, wherein the received current location identifier comprises a current cell identifier, the first registered location identifier comprises a registered cell identifier, and monitoring the current location of the mobile device by the baseband subsystem includes:
comparing the current cell identifier with the registered cell identifier; and
upon determining that the current cell identifier matches the registered cell identifier, activating the application subsystem.

6. The method of claim 1, wherein transferring location monitoring to the application subsystem includes invoking an application program that triangulates the current location based on locations of one or more wireless access gateways, the application program executing by the application subsystem of the mobile device.

7. The method of claim 1, wherein transferring location monitoring to the application subsystem includes determining the current location using a global positioning system (GPS) signal.

8. The method of claim 1, wherein:
performing the location-based task includes invoking an application program by the application subsystem.

9. The method of claim 6, wherein the wireless access gateways include wireless access points of a wireless local area network.

10. A system comprising:
an interface configured for receiving a request to perform a location-based task, the location-based task comprising executing a program when a mobile device is located in a specified geographic region;

an application subsystem comprising an application processor; and a baseband subsystem comprising a baseband processor configured for monitoring a current location of the mobile device while the application subsystem of the mobile device is in a power-saving mode, monitoring the current location comprising:

comparing at least a portion of a current location identifier received by the baseband subsystem from a cellular network with a first registered location identifier, the first registered location identifier corresponding to a first tier of location granularity and being registered with the baseband subsystem by the application subsystem;

based on a result of the comparing, activating the application subsystem, wherein the application subsystem comprises an application processor, and the baseband subsystem comprises a baseband processor that consumes less power than the application subsystem when the application subsystem is activated; and triggering, by the application subsystem upon being activated, a change of location monitoring, the change of location monitoring including at least one of:

registering, at the baseband subsystem, a second location identifier corresponding to a second tier of location granularity for monitoring a current location; or transferring location monitoring to the application subsystem, wherein the application subsystem performs the task upon determining, by either the baseband subsystem or the application subsystem, that the current location of the mobile device is within the geographic region.

11. The system of claim 10, wherein the received current location identifier comprises a current location area code, the first registered location identifier comprises a registered location area code, and monitoring the current location of the mobile device by the baseband processor includes:

comparing the current location area code with the registered location area code; and upon determining that the current location area code matches the registered location area code, activating the application subsystem of the mobile device.

12. The system of claim 10, wherein the received current location identifier comprises a current mobile country code, the first registered location identifier comprises a registered mobile country code, and monitoring the current location of the mobile device by the baseband processor includes:

comparing the current mobile country code with the registered mobile country code; and upon determining that the current mobile country code matches the registered mobile country code, activating the application subsystem of the mobile device.

13. A computer program product, tangibly stored on a mobile device, operable to cause the mobile device to perform operations comprising:

receiving a request to perform a location-based task, the location-based task comprising operations of executing a program when the mobile device is located in a specified geographic region;

monitoring, using a baseband subsystem of the mobile device while an application subsystem of the mobile device is in a power-saving mode, a current location of the mobile device, including:

comparing at least a portion of a current location identifier received by the baseband subsystem from a cellular network with a first registered location identifier, the first registered location identifier corresponding to a first tier of location granularity and being registered with the baseband subsystem by the application subsystem; and based on a result of the comparing, activating the application subsystem, wherein the application subsystem comprises an application processor, and the baseband subsystem comprises a baseband processor that consumes less power than the application subsystem when the application subsystem is activated;

triggering, by the application subsystem upon being activated, a change of location monitoring, the change of location monitoring including at least one of:

registering, at the baseband subsystem, a second location identifier corresponding to a second tier of location granularity for monitoring a current location; or transferring location monitoring to the application subsystem; and performing the task by the mobile device upon determining, by either the baseband subsystem or the application subsystem, that the current location of the mobile device is within the geographic region.

14. The product of claim 13, wherein the received current location identifier comprises a current location area code, the first registered location identifier comprises a registered location area code, and monitoring the current location of the mobile device by the baseband subsystem includes:

comparing the current location area code with the registered location area code; and upon determining that the current location area code matches the registered location area code, activating the application subsystem of the mobile device.

15. The product of claim 13, wherein the received current location identifier comprises a current mobile country code, the first registered location identifier comprises a registered mobile country code, and monitoring the current location of the mobile device by the baseband subsystem includes:

comparing the current mobile country code with a registered mobile country code; and upon determining that the current mobile country code matches the registered mobile country code, activating the application subsystem.

16. The product of claim 13, wherein the received current location identifier comprises a current mobile network code, the first registered location identifier comprises a registered mobile network code, and monitoring the current location of the mobile device by the baseband subsystem includes:

comparing the current mobile network code with the registered mobile network code; and upon determining that the current network code matches the registered network country code, activating the application subsystem.

17. The product of claim 13, wherein the received current location identifier comprises a current cell identifier, the first registered location identifier comprises a registered lo cell identifier, and monitoring the current location of the mobile device by the baseband subsystem includes:

comparing the current cell identifier with the registered cell identifier; and upon determining that the current cell identifier matches the registered cell identifier, activating the application subsystem.

18. The product of claim 13, wherein transferring location monitoring to the application subsystem includes invoking an application program that triangulates the current location based on locations of the one or more wireless access gateways, the application program executing in the application subsystem of the mobile device.

* * * * *

UNITED STATES PATENT AND TRADEMARK OFFICE
CERTIFICATE OF CORRECTION

PATENT NO. : 8,504,061 B2
APPLICATION NO. : 12/756016
DATED : August 6, 2013
INVENTOR(S) : Morgan Grainger, Ronald K. Huang and Robert Mayor Page 1 of 1

It is certified that error appears in the above-identified patent and that said Letters Patent is hereby corrected as shown below:

In the Claims

Column 18, Line 51 at Claim 17; replace:
"registered location identifier comprises a registered lo cell" with
-- registered location identifier comprises a registered cell --

Signed and Sealed this
Twenty-sixth Day of November, 2013

Margaret A. Focarino
*Commissioner for Patents of the United States Patent and Trademark Office*